United States Patent [19]

La Rocca

[11] Patent Number: 4,661,677

[45] Date of Patent: Apr. 28, 1987

[54] DEEP PENETRATION LASER WELDING OF SHEET METAL

[75] Inventor: Aldo V. La Rocca, Moncalieri, Italy

[73] Assignee: Fiat Auto S.p.A., Turin, Italy

[21] Appl. No.: 767,406

[22] Filed: Aug. 20, 1985

[30] Foreign Application Priority Data

Aug. 20, 1984 [IT] Italy ................... 67835 A/84

[51] Int. Cl.⁴ ............................................. B23K 26/00
[52] U.S. Cl. ..................... 219/121 LD; 219/137 R; 219/121 LM; 219/121 ED
[58] Field of Search ............... 219/121 LC, 121 LD, 219/121 LU, 121 LV, 121 LW, 121 EC, 121 ED, 121 EM, 121 LM

[56] References Cited

U.S. PATENT DOCUMENTS 3,969,604  7/1976  Baardsen ................ 219/121 LD
4,237,363  12/1980  Lemelson ................ 219/121 LD

FOREIGN PATENT DOCUMENTS 0102257  8/1979  Japan ...................... 219/121 LD

*Primary Examiner*—M. H. Paschall
*Attorney, Agent, or Firm*—Sughrue, Mion, Zinn, Macpeak & Seas

[57] ABSTRACT

A sheet metal welding process is described in which limited zones of contact of metal sheets (A, B) are heated locally by a power laser so as to cause fusion in the manner of spot or seam welds (P, C). Such spot or seam welds are achieved by deep penetration welding of juxtaposed metal sheets joined by a plurality of welding spots or seams, these may be spaced apart such that the sheet metal portions between the spots or seams can deform in an elastic-plastic manner under stress.

1 Claim, 9 Drawing Figures

DEEP PENETRATION LASER WELDING OF SHEET METAL

The present invention relates to a sheet metal welding process. More particularly, the invention relates to a sheet metal welding process in which limited contact zones of metal sheets are heated locally by a power laser so as to cause their fusion and form spot or seam welds.

STATE OF THE PRIOR ART

Conventionally sheet metal welding by the use of a laser, particularly of thin sheets, that is sheets having a thickness of about 1 mm, is of the so-called conduction type; the laser is focussed on the surface of the metal sheets so that the point of highest temperature in the welding zone is on the surface. The heat is propagated through the underlying material according to the laws of propagation by conduction, giving the name to this type of welding. FIG. 1 of the appended drawings shows the welding of two juxtaposed metal sheets A, B carried out by conventional conduction laser welding. A monolithic region C is formed in the zone of welding of the two metal sheets and has in cross section a profile substantially in the form of a parabola. The weld C may be characterised by a parameter known as an "aspect ratio", expressed as the ratio between the depth h of the weld and its width b (see FIG. 1). With the use of conventional conduction laser welding processes, welds are obtained with an aspect ratio of the order of 1-1.5.

From a metallurgical point of view, conduction laser welding is essentially equivalent to conventional welding, for example arc or electrical resistance welding: in the welding zone the material is coarse-grained and forms inter-granular segregation zones, pores, etc.

Furthermore, a wide thermally altered zone (indicated H in FIG. 1) is created around the weld; in the welding of sheet metal, the significant thermal stresses may result in considerable distortion in the sheet metal itself, in a manner which also depends on the way in which the metal sheets are joined together.

From an energy point of view, the efficiency (understood as the ratio between the energy needed to form a unit volume of seam or spot welding and the energy transmitted to the piece and hence dispersed by conduction) in conventional conduction welding processes is very low, and in particular between 5 and 15%. This notwithstanding, conduction laser welding has in any case been used in that it allows seam or spot welding to be achieved with a large section which is resistant to shearing: welds formed in this manner satisfy the strength specifications normally required. However, both from an energy point of view and that of quality and reproducability of the weld quality the conventional conduction laser welding processes are unsatisfactory, particularly in the case of thin sheet metal, for reasons which will be explained below.

OBJECT OF THE INVENTION

The object of the present invention is to provide a sheet metal welding process which is free from the disadvantages of the prior art, and in particular allows better quality, reproducable welding to be achieved with a considerably higher energy efficiency.

DESCRIPTION OF THE INVENTION

This object is achieved according to the invention by means of a welding process in which limited contact zones of metal sheets are heated locally by a power laser so as to cause their fusion and form spot or seam welds, characterised in that the spot or seam welds are achieved by deep penetration laser welding.

The technique of deep penetration laser welding, in which the point of the welding zone at the highest temperature is within the metal sheets or beneath the surfaces of the metal sheets to be welded, although giving rise to energy dispersing phenomena, such as vapourisation of material and ionisation of the vapours, is, overall, energetically more efficient: the ratio between the energy needed to create a unit volume of seam or spot welding and the energy transmitted to the piece and hence dispersed by conduction reaches very high values, up to 80%.

The characteristics of deep penetration laser welding applied to mechanical pieces and a hypothesis of explaining its better energy efficiency have been given by the inventor at, for example, Proceedings of the International Conference on Lasers 1979, Orlando, Fla., pages 61–87.

The invention consists of the application of this technique to sheet metal welding.

BRIEF DESCRIPTION OF THE DRAWINGS

Further characteristics and advantages of the process according to the invention will become apparent from the detailed description which follows, given with reference to the appended drawings, provided purely by way of non-limiting example, in which.

DETAILED DESCRIPTION OF THE EXAMPLES

Figure 2:
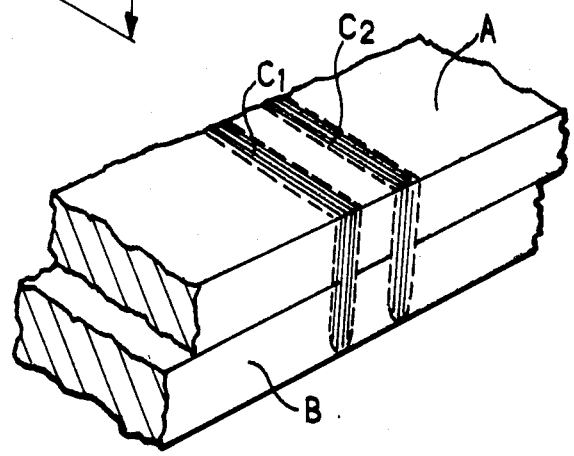
FIGS. 2 to 4 show superposed sheet metal portions welded by the deep penetration laser welding method of the invention.

FIG. 2 shows two sheet metal portions A, B joined by two parallel seam welds $C_1$ and $C_2$ effected by deep penetration laser welding.

Figure 1:
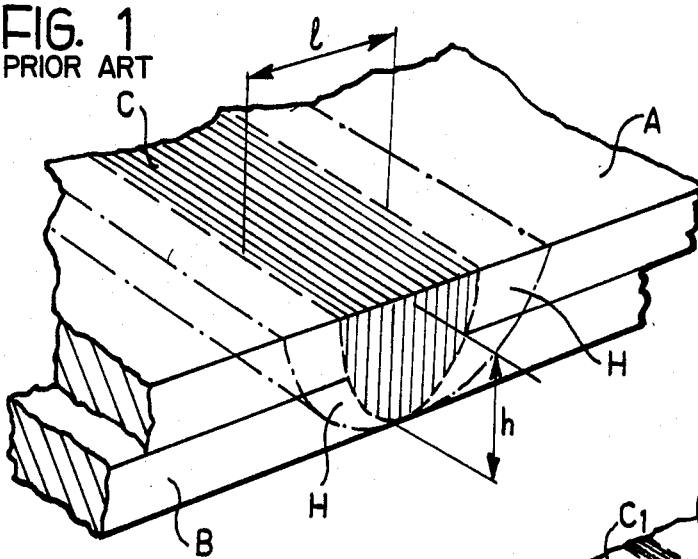
FIG. 1, already described, shows two superposed sheet metal portions welded by conduction laser welding according to the prior art.

The Applicant has carried out comparative tests between metal sheets welded according to the prior art of FIG. 1, and metal sheets welded according to the invention as shown in FIG. 2.

In particular the welds achieved and their characteristics were compared and the results are given in Tables 1 and 2 below.

TABLE 1

| (Conduction welding: FIG. 1) | |
| --- | --- |
| Thickness of metal sheets A, B | 0,8 mm (each) |
| Width of seam b | 1,6 mm |
| Depth of seam h | 1,6 mm |
| Aspect ratio h/b | 1 |

TABLE 2

(Penetration Weld: FIG. 2)

| | |
|---|---|
| Thickness of metal sheet A, B | 0.8 mm (each) |
| Width of seams $C_1$, $C_2$ | 0.3 mm (each) |
| Depth of seams $C_1$, $C_2$ | 1.5 mm |
| Aspect ratio of seams $C_1$, $C_2$ | 5 |
| Distance between the seams $C_1$, $C_2$ | 0.5 mm |

In the case of the test according to Table 2, the distance between the seams was chosen at random; the object was simply to double the section strength; hence this distance does not correspond to the optimum distance for the purposes of reducing the load concentration and improving the resistance to blows, impacts and consequent fatigue.

As may be found from an examination of FIG. 1, the section strength of the seam C (FIG. 1) of the weld achieved by conduction is considerably greater than the overall section strength of the seams $C_1$ and $C_2$ formed by the penetration welding method. This notwithstanding, and in some sense surprisingly, under peeling tests, the structure of FIG. 2 (Table 2) was much stronger than the structure shown in FIG. 1 (Table 1). This improved behaviour of the weld achieved by the penetration method is very probably due in part to the better metallurgical characteristics of the material constituting the seam weld formed by this method, and in part to the fact that the whole structure formed by the welded metal sheets is involved in elastic-plastic deformations.

Figure 3:
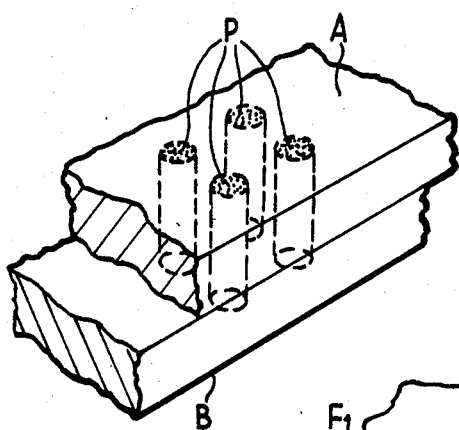

Further tests carried out by the Applicants have shown that the best structural characteristics can be obtained by welding two metal sheets A, B by adjacent spot welds effected by the penetration laser welding method as shown by way of example in FIG. 3. In this Figure the spot welds are indicated P. These spot welds also have a very high aspect ratio and are located at mutual spacings of 1.5 times the overall thickness of the metal sheets.

Figure 4:
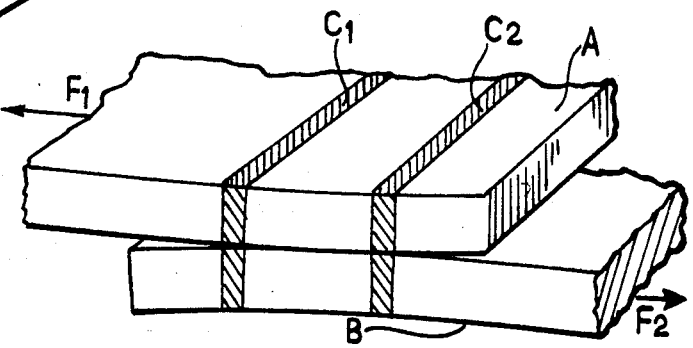
Figure 5:
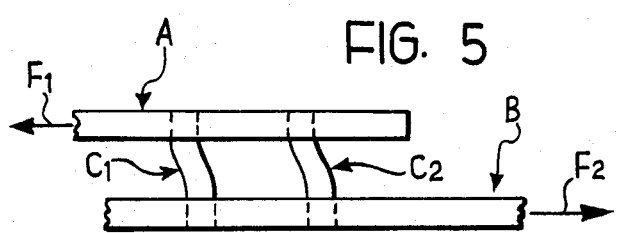
FIG. 5 shows a structure by way of example which is arranged to explain the division of the loads in a structure of the type shown in FIG. 4, comprising two metal sheets welded by the method of the invention.

The improved behaviour of the welds achieved according to the invention may in part be explained by the following considerations, which will now be set out with reference to FIGS. 4 and 5. FIG. 4 shows a structure of the type shown in FIG. 2: two metal sheets A, B are welded together by two seam welds $C_1$ and $C_2$ achieved by the deep penetration laser welding method. If the metal sheets A and B are subjected to tensile forces in opposite directions, as indicated by the arrows $F_1$ and $F_2$, they tend to deform in the manner illustrated in FIG. 5. FIG. 5 shows a structure substantially corresponding to that formed by the welded metal sheets of FIG. 4 but where the seam welds $C_1$ and $C_2$ have been shown as walls engaged at their ends in the plates A, B. The model shown in FIG. 5 corresponds to the structure of FIG. 4, in which the height of the walls $C_1$ and $C_2$ tends to zero.

As may be seen intuitively from observation of FIG. 5, when the structure represented in this Figure is subject to stress, for example by forces acting according to the arrows $F_1$ and $F_2$, an elastic-plastic type deformation of the portions of sheet metal between the seams and of the seams themselves occurs, so that the overall structure behaves as a "box". It should be remembered that in the case of rupture of welded sheets, the deformations "issue" strikingly from the plane of the initial stresses. This involves an energy absorption as long as the joining elements are not rigid and yield weakly. Thus there is no "rigid" transmission of forces or stresses from one seam or spot weld to the next but there is a progressive absorption (and hence a progressive reduction) as a result of the absorption of part of the stresses and forces in the structure itself.

By way of illustration, the tests carried out up until now have shown that the behaviour of the structure shown in FIG. 4 is effectively like that of the structure shown in FIG. 5 for distances between the seams $C_1$ and $C_2$ of the order of 1.5 or more times the thickness of the metal sheets.

As indicated in the publication mentioned above, the metallurgical characteristics of the seam achieved by penetration laser welding are better than those of the initial material because of an action of "refining" of the material which occurs during the welding.

Figure 6:
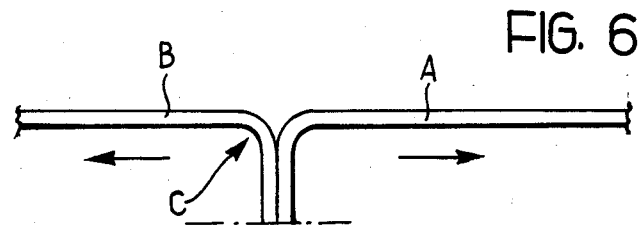
FIGS. 6 to 8 show in profile, in plan and in section on an enlarged scale respectively, two strips of sheet metal welded according to the invention, after a peeling test.
Figure 7:
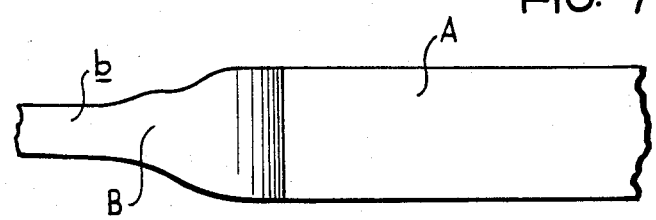
Figure 8:
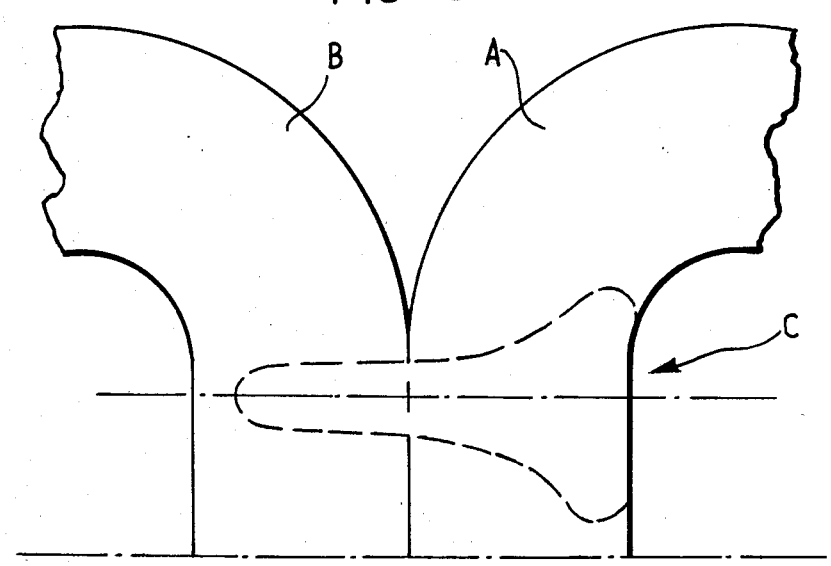

This results in a greater strength and tenacity of the seam relative to the surrounding material as is apparent from FIGS. 6 to 8, taken from photographs, which show the deformation undergone by two strips of sheet metal A, B (joined by means of a penetration laser weld seam P in the median zone) subjected to a peeling test. FIGS. 6 and 7 show in profile and in plan respectively the strips of sheet metal after the peeling test. FIG. 8 is a section on an enlarged scale of the weld zone. FIG. 7 shows how, in the peeling test, the material of the seam C resisted better than one of the ends (indicated b, originally rectangular) which has become strongly deformed and torn under the tensile force.

Figure 9:
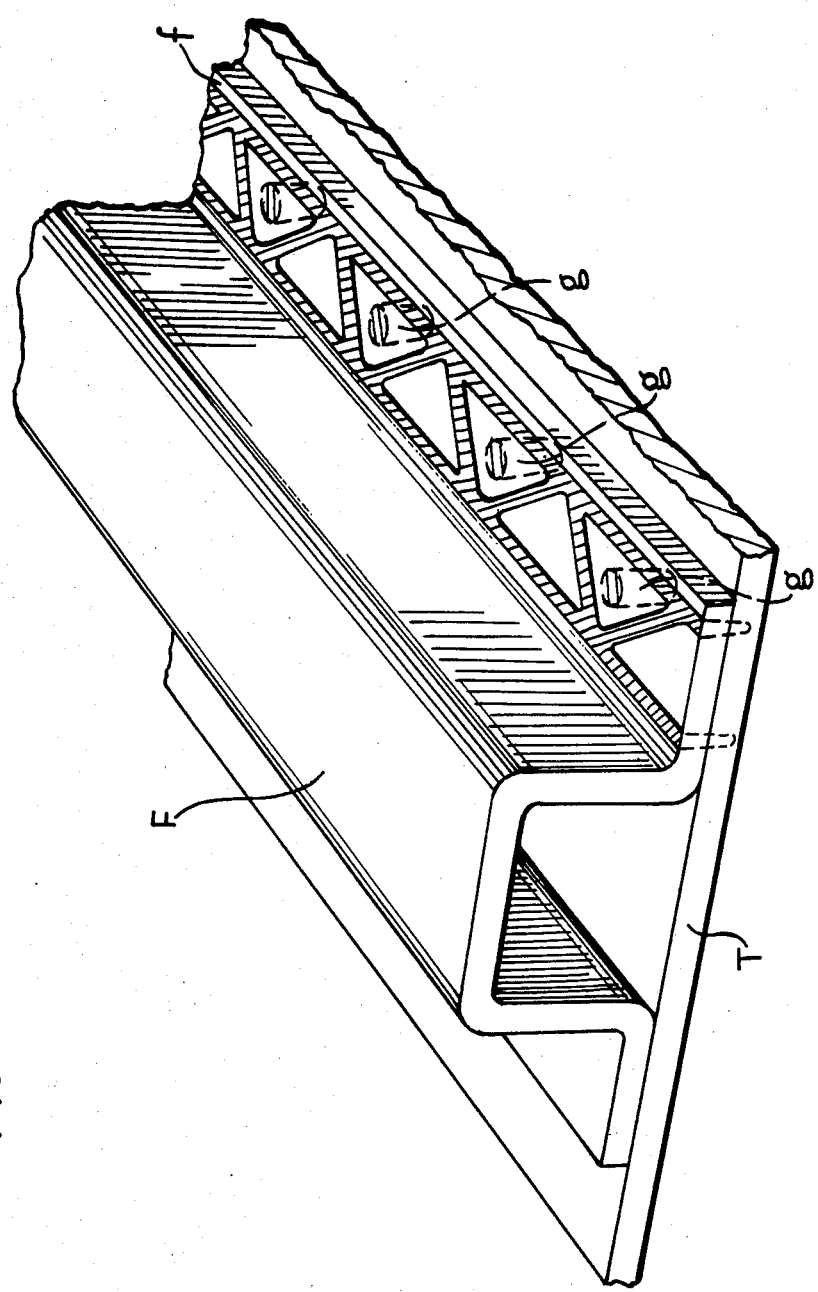
FIG. 9 shows an application of the welding method of the invention to the welding of two superposed flanges.

A further application of the method according to the invention is shown in FIG. 9 in which a flange f of a box structure F is welded to an edge of a plate T by a series of seam welds effected in a lattice arrangement. The seam welds thus effected form overall structure like a cross-linked framework which can absorb and distribute the stresses much more effectively than would be the case if the structure F were welded to the plate T by conventional spot welds, such as those indicated g in FIG. 9.

In general, to weld two or more metal sheets, seams may be used in the form of one or more continuous lines, for example a straight line, a line made up of segments in the form of a "Greek key" pattern, a curved line such as a sine wave, and a line including straight portions and curved portions such as a succession of straight portions alternating with semi-circles.

I claim:

1. A deep penetration laser welding process for welding metal sheets comprising juxtaposing two metal sheets, heating said sheets locally at at least two spaced apart locations having a distance therebetween of at least 1.5 times the thickness of said metal sheet by power laser means to effect deep penetration welding causing the sheets to fuse at said locations to form spaced apart welds, moving said sheets relative to said power laser means to form two spaced apart continuous line welds and forming a plurality of additional discontinuous welds extending between and intersecting said continuous line welds whereby a cross linked structure is formed for effectively absorbing and distributing stresses.

* * * * *